United States Patent [19]

Vindriis

[11] Patent Number: 5,538,083
[45] Date of Patent: Jul. 23, 1996

[54] HORSESHOE ARRANGEMENT

[76] Inventor: Søren Vindriis, Tulipanparken 43, DK-8700 Horsens, Denmark

[21] Appl. No.: 302,696
[22] PCT Filed: Mar. 8, 1993
[86] PCT No.: PCT/DK93/00087
 § 371 Date: Sep. 28, 1994
 § 102(e) Date: Sep. 28, 1994
[87] PCT Pub. No.: WO93/17550
 PCT Pub. Date: Sep. 16, 1993

[51] Int. Cl.⁶ ........................................ A01L 1/04
[52] U.S. Cl. ............................ 168/6; 168/4; 168/13
[58] Field of Search .......................... 168/4, 6, 13, 23

[56] References Cited

U.S. PATENT DOCUMENTS

| | | | |
|---|---|---|---|
| 372,652 | 11/1887 | Bingham | 168/6 |
| 646,029 | 3/1900 | Long. | |
| 661,593 | 11/1900 | Waste | 168/13 |
| 1,271,177 | 7/1918 | Kusiak | 168/4 |
| 4,513,824 | 4/1985 | Ford | 168/4 |

FOREIGN PATENT DOCUMENTS

| | | |
|---|---|---|
| 153511 | 7/1988 | Denmark. |
| 157520 | 1/1990 | Denmark. |
| 265088 | 11/1912 | Germany. |
| 8597 | 4/1897 | Sweden. |
| 1213257 | 11/1970 | United Kingdom. |

*Primary Examiner*—Robert P. Swiatek
*Attorney, Agent, or Firm*—Watson Cole Stevens Davis

[57] ABSTRACT

A horseshoe arrangement comprising individually replaceable wearing parts which makes it possible to increase the life of the parts of a horseshoe which are worn-out. Consequently, the horseshoe arrangement comprises separate nail-receiving devices which are mounted in holes of a basis profile as well as wearing soles and locking devices. The individual parts may be replaced according to requirement when these are worn-out without replacing the remaining parts, if these are not yet completely worn-out.

12 Claims, 11 Drawing Sheets

HORSESHOE ARRANGEMENT

THE BACKGROUND OF THE INVENTION

The present invention relates to a horseshoe that includes a basis profile of a body which is provided with holes for nails, a wearing plate with means for attachment to the basis profile, as well as wearing soles with means for attachment to the basis profile and the wearing plate.

U.S. Pat. No. 646,029 discloses a horseshoe of this type in which a basis profile is provided with a wearing plate and shock-absorbing wearing soles which are fixed to the basis profile. The disadvantage of this horseshoe is that, due to the insufficient thickness of the material of the basis profile, there is a substantial risk for cracks appearing around the nail-receiving holes because of the notch effect which the nail holes provide. Furthermore, the screws which are used for fixation of the wearing plate and the wearing soles are exposed to hard wear, and consequently these cannot be unscrewed when the wearing plate or the wearing sales have to be replaced.

DK publication No. 157,520 discloses a horseshoe in which the problem with hard wearing of the fixation means is remidied by means of simple tenon and hole mechanisms. The wearing plate and the shock-absorbing wearing soles are constituted as one single unit as the wearing soles extend as one single wearing sole along the entire basis profile and the wearing plate is embedded in the wearing sole which is manufactured from plastics. Therefore, these parts cannot be individually replaced. Furthermore, a substantial risk for cracks appearing around the nail-receiving holes also exist because the basis profile is manufactured of a plate having an insufficient thickness of material and thus it does not have a sufficient strength around the nail-receiving holes.

A primary disadvantage in the known prior art is that the horseshoe does not possess sufficiently flexibility regarding the individual adjustment of the basis profile to the geometry of the individual hoof. The adjustment of the prior art horseshoes will cause a great risk that the fixation devices between the basis profile, the wearing sole and the wearing plate, respectively, will change size, thus the fixation is weakened. This may cause that the wearing sole and the wearing plate art 34 to become disconnected and lost during daily use.

A secondary disadvantage by this prior art is that the horseshoes do not possess sufficiently flexibility regarding replacement of the individual parts which are exposed to dally hard wear. The wearing arises in the nail-receiving holes in which the nails pass through the basis profile, on the wearing plate as well as on the wearing soles. The wearing of these parts may differ with different time intervals depending on the individual horse and depending on for which riding activity the horse is used.

It is therefore the object of the present invention to provide a horseshoe in which the adjustment of different hoof geometries is possible and wherein the wearing parts may be individually replaced replaced-thus the number of replacements of the basis profile is minimized.

SUMMARY OF THE INVENTION

These objects are achieved by means of a horseshoe. Wherein the horseshoe furthermore comprises nail-receiving devices, wherein the nail-receiving devices are mounted in the holes of the basis profile, wherein the wearing plate comprises a lock fitting which is arranged between the wearing plate and the basis profile and which co-operate with locking devices on the basis profile and wherein the wearing soles comprise first locking devices comprising coupling pins and pawl-receiving elements which are mounted in the foremost and rearmost part of each wearing sole respectively and which co-operate with second locking devices comprising holds and pawls on the wearing plate and basis profile, respectively.

This ensures an increased adaptability in that the fixation devices between the basis profile and the nail-receiving devices, respectively, and the wearing soles and the wearing plate are mounted individually to the basis profile. Thus the individual elements cannot change size individually during the adjusting of the basis profile to the hoof. In this connection it should be noted that a substantial difference of the shape of the hoof may exist according to the horse breed as well as the shape of the hoof may vary among the individual horse breeds and depending on in which part of the world the horses have been bred.

It is furthermore ensured that the wearing parts may be replaced individually without the necessity of replacing all parts. Furthermore, the risk of cracks appearing around the nail holes in the basis profile is substantially lessened when using nail-receiving devices and the life-time of the basis profile is thus increased substantially in lotion to the profiles which have previously been used. This will reduce the shoe-expenses in connection with the caring of the horse.

According to an advantageous embodiment the nail-receiving devices are manufactured with the actual nail hole centered differently in relation to the outer contour of the nail-receiving device. Furthermore, the centre axis of the actual nail hale may have different angles of inclination in relation to the centre axis of the outer contour of the nail-receiving device. Thereby it becomes possible to position the nails in the hoof taking the size and the shape of individual hoof into consideration. A basis profile with a given positioning of holes for the nail-receiving devices can thus be used for hooves with different hoof thicknesses as the positioning of the nail across the basis profile as mentioned is established by means of the chosen nail-receiving device and not by means of the hole in the basis profile which is the case in the prior art basis profiles. Hereby the flexibility of the horseshoe is further increased, Furthermore, the nail-receiving devices will reduce the tensions in the hoof, when the hoof grows as the nail-receiving devices are manufactured from a flexible material which permits the nails to alter inclination pari passu with the growth of the hoof. The above-mentioned problem cannot be remedied by means of the prior art horseshoes as the nails have no possibility of adjusting in the nail holes of the basis profile. Due to stress in the prior art horseshoes a substantial wearing in the nail-receiving devices occurs, thus the basis profile normally has to be replaced. According to the invention the nail-receiving devices may be replaced when this is found necessary without the necessity of replacing the basis profile.

The nail hole in the nail-receiving devices will furthermore be provided with a recess in the corners. Hereby the notch effect is avoided in the nail holes as the nails only carry the stress on their plane sides and the life-time of the nail-receiving devices and the basis profile are thus substantially increased.

The advantage of manufacturing the wearing plate and the wearing soles as single units is, like the advantage of the nail-receiving devices, to have the possibility of replacing every single part of the horseshoe individually when these parts are worn-out. As mentioned the parts are worn with different time-intervals and a basis profile with a nail-receiving devices will last substantially longer than one without, however, the wearing plate and the wearing soles will most probably wear out much faster. With the horseshoe according to the invention it is possible to replace these elements more frequently than, e.g., the basis profile.

By manufacturing the wearing plate and the wearing soles as single units it is furthermore possible to use the basis profile to several horse breeds and types of hoof, the choice of wearing plate and wearing soles depends on the circumstances in which the horse is to be used. Light parts for trotting and galloping, stronger parts for riding in the nature and other specific demands and wishes.

The above-described advantages result in that the basis profile obtains a substantially longer life and simultaneously, the worn out parts may be replaced individually. Furthermore, the horseshoe according to the invention provides an increased security for not loosing the basis profile, the wearing plate and wearing soles while being used. These factors reduce the costs in using the horseshoe.

According to advantageous embodiments for the fixation means and the locking devices for fixation of the wearing plate to the basis profile, these are provided with individual double spring pads which provide an efficient locking and simultaneously the wearing plate can transmit longitudinal and transverse forces to the basis profile.

The locking of the wearing soles and the basis profile is advantageously performed by means of a tenon and hole connection as well as by locking ridges and a locking bead provided in the basis profile and wearing sole, respectively.

The flexibility of the horseshoe implies that it may be adjusted all hoof geometries and hoof thicknesses irrespective of the breed and use of the horse which is important for the blacksmith's stock of With the horseshoe according to the invention the horse-owner is not dependent on the blacksmith in connection with the replacement of the wearing plate and the wearing soles when these are worn out or in connection with adjustment of these parts in relation to different riding conditions.

BRIEF DESCRIPTION OF THE DRAWINGS

The invention will now be explained in further detail with reference to the accompanying drawings wherein FIGS. 5C & 50 illustrate a section through a wearing sole.

DETAILED DESCRIPTION OF THE PREFERRED EMBODIMENT

Figure 1A:
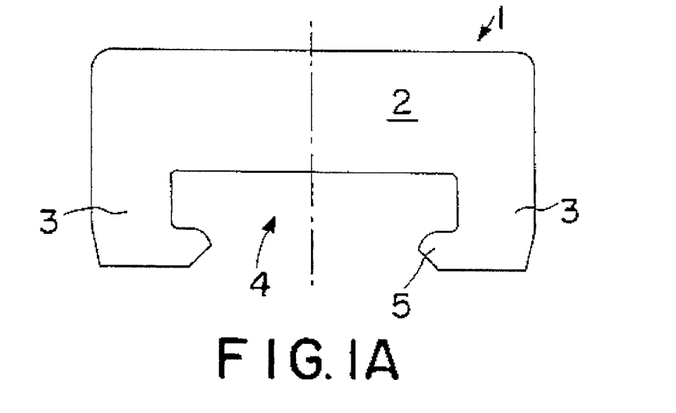
FIGS. 1A, 1B, 1C, 1D and 1E illustrate alternative embodiments of the cross-section of a basis profile.
Figure 1B:
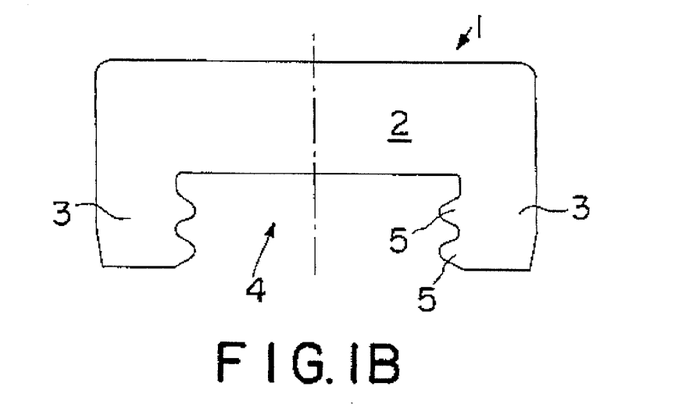
Figure 1C:
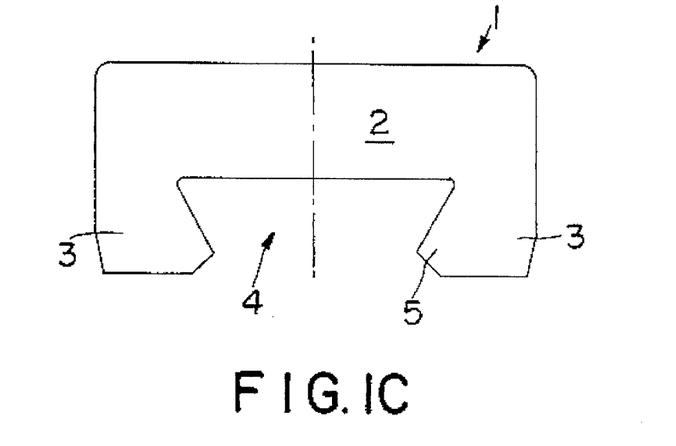

FIGS. 1A, 1B and 1C illustrate alternative cross-sections of a basis profile 1. The cross-section in FIG. 1A consists of a body 2 and two edges 3. Between the edges 3 and the body 2 a canal 4 is formed. The edges 3 are provided with locking bars 5 which extend from the edges. 3 into the canal 4. FIG. 1B shows a cross-section which is substantially equal to the one shown in FIG. 1A, but in which the edges 3 each are provided with two locking bars 5 which also extend into the canal 4. FIG. 1C shows a cross-section in which the locking bats 5 are provided in such a way that the canal 4 assumes a dovetailed cross-section.

Figure 1D:
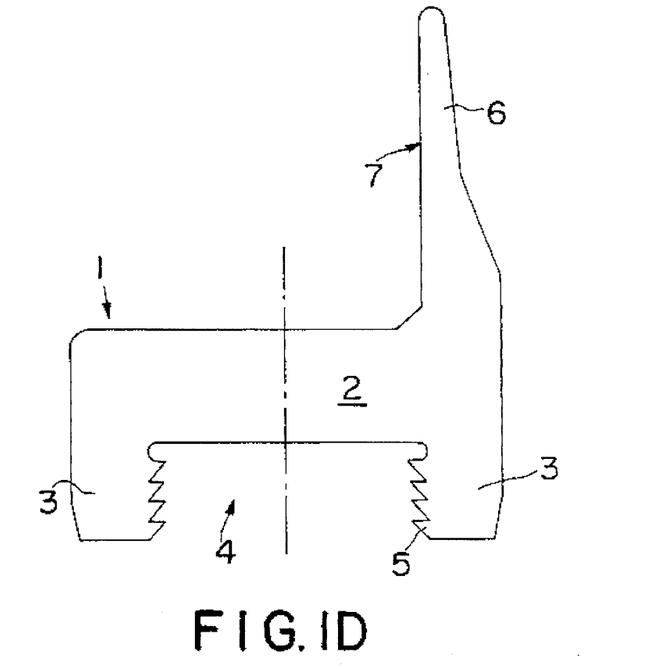

FIG. 1D illustrates a further embodiment provided with several locking bars 5, which on each edge 3 form a serrated pattern on the inner side of the canal 4. The cross-section of the basis profile 1 shown in this Fig. Furthermore illustrates a toe clip 6. The inner side 7 of this toe clip is in abutment with the foremost part of the hoof when the basis profile is secured to the hoof.

Figure 1E:
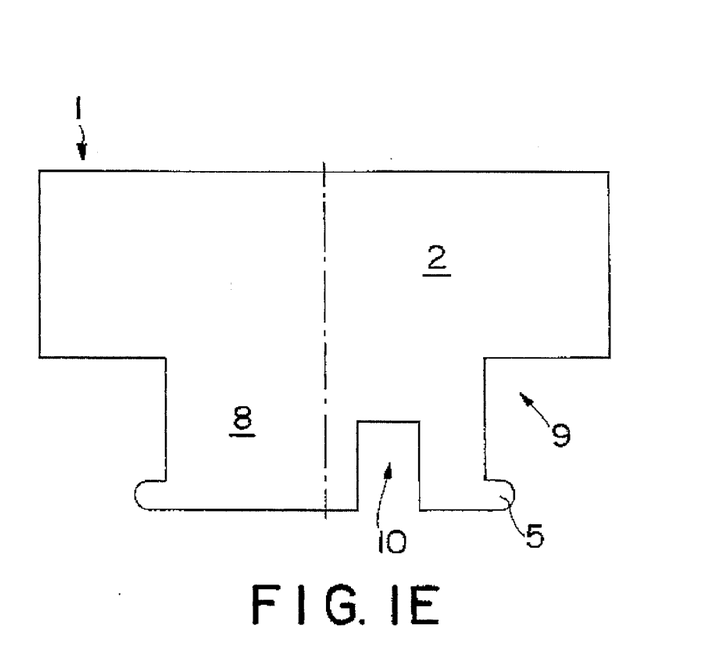

FIG. 1E illustrates an alternative embodiment of the cross-section of a basis profile 1. This cross-section comprises a body 2 and a bar 8 provided with locking bars 5. Hereby two open grooves 9 are formed corresponding to the canal 4. The bar 8 is furthermore provided with a ridge 10.

The basis profile 1 is advantageously manufactured from aluminium. Hereby it becomes possible to manufacture the profile by means of extrusion. This process of manufacture results in lesser tool costs than by means of processes of plate manufacturing which are used in the manufacturing of the known horseshoes. Simultaneously, it will be possible to manufacture many different sizes of horseshoes of the same extruded profile. The toe clip 6 can be provided in the desired number and with the desired form and the manufacturing process is performed before the profile is bent to the shape of a horseshoe. The basis profile may, e.g., also be manufactured from rolled steel. By means of this manufacturing process it will, however, be necessary to weld the toe clip 6 to the basis profile 1.

Figure 2A:
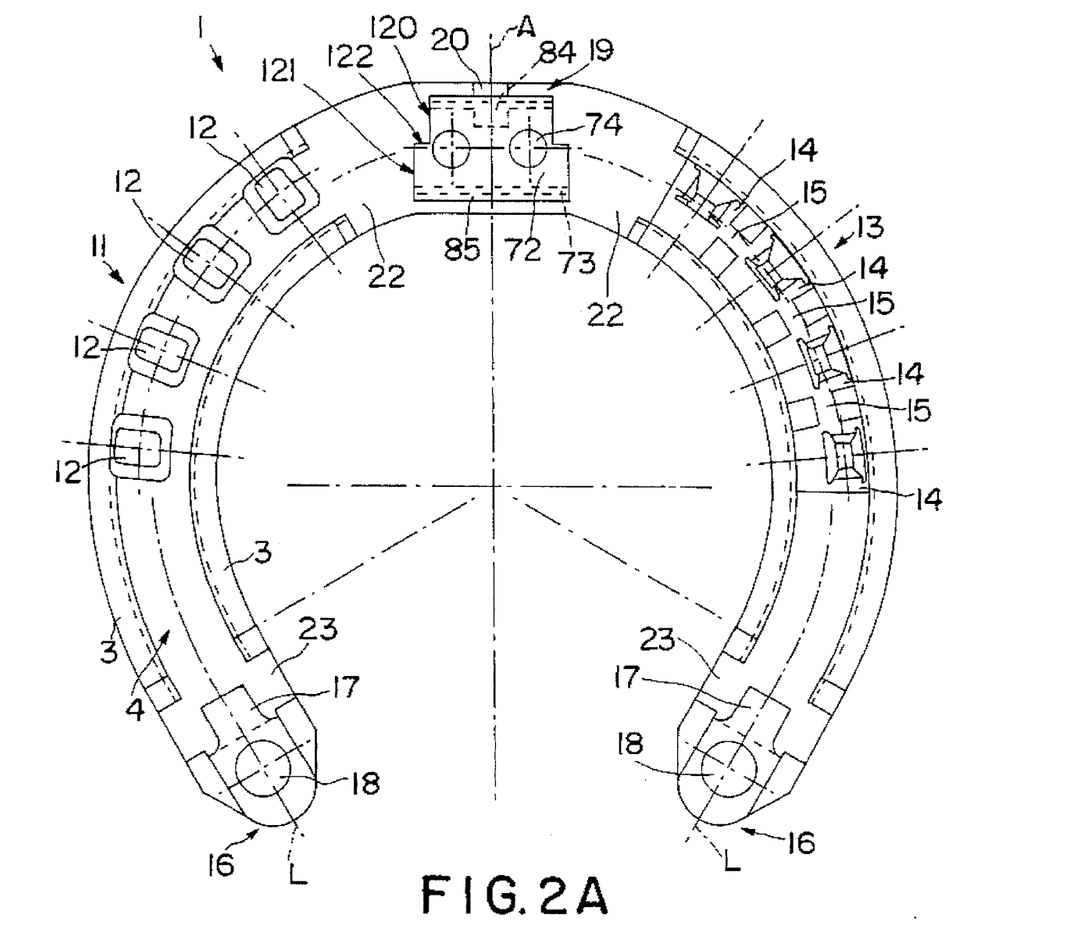
FIG. 2A illustrates an embodiment of a basis profile, seen in bottom plan view.

FIG. 2A illustrates the basis profile 1 in bottom plan view, i.e., from the direction which in use faces downwardly. The profile is symmetrical about the line A, and in this specific Figure it has not been provided with a wearing plate or wearing soles.

The left lateral branch 11 of the basis profile shows the edges 3 which form the canal 4. In the canal 4 holes 12 are provided for the positioning of the nail-receiving devices. This is shown in the right lateral branch 13 of the basis profile in which the nail-receiving devices 14, which are mutually connected by means of connecting links 15, are arranged in the holes 12 of the basis profile. In both of the lateral heels 16 the basis profile is provided with a pawl 17 to be used for fixation of the wearing soles to the basis profile. Each pawl is fixed by means of a rivet 18.

In the foremost end of the basis profile a locking device 19 is mounted for the wearing plate. The locking device 19 consists of a bent plate spring 72 (see FIGS. 8A–8G) mounted on a base plate 73 (shown at the broken line) and is secured to the basis profile 1 by means of rivets 74. In the bent plate spring 72 and in the base plate 73 notches 84,85 are made (shown with broken lines) for securing tenons or straps which form part of a lock fitting (see FIG. 6A). Along the opposite sides of the locking device a contour is formed consisting of two edges 120, 121 (see FIG. 2A) which is substantially parallel to the symmetry axis A and an edge 122 which is substantially perpendicular to the symmetry axis A. These edges 120,121,122 co-operate with securing edges on a corresponding lock fitting (see FIG. 6A), thus the connection of the locking device 19 and the lock fitting may absorb transverse as well as longitudinal forces.

A track 20 is formed foremost on the basis profile. A more detailed illustration of the locking device 19 and the function of the track 20 will appear in FIG. 8D.

Figure 2B:
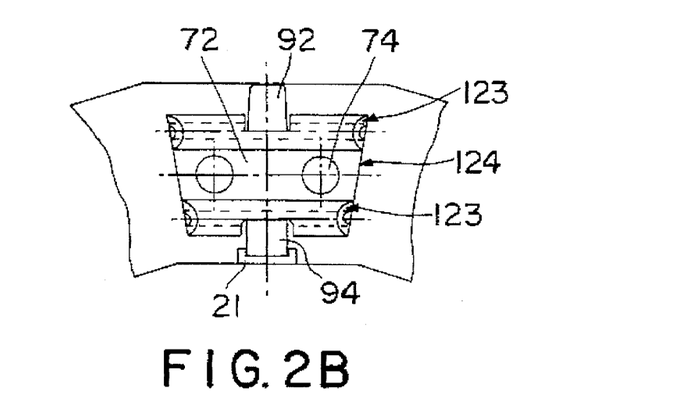
FIG. 2B illustrates an alternative embodiment of a fixation means.

In FIG. 2B an alternative embodiment of the locking device 19 is shown. This locking device 19a does also consist of a bent plate spring 72, but is secured to the basis profile by being bent in the middle, thus it abuts the basis profile 1 and is secured by means of rivets 74 without a base plate. In the bent plate spring 72 tongues 92,94 are formed which through devices in a lock fitting (see FIGS. 6B–6C) secure this lock fitting to the basis profile. The absorption of the transverse and longitudinal forces between the locking device and the corresponding lock fitting (see FIGS. 6B and 6C) takes place because the side edges of the locking device are beveled so that inclined surfaces 123, 124 are formed which abut the edges on the lock fitting.

A track 21 is formed rearmost on the foremost part of the basis profile. The locking device 19a is shown more detailed in FIG. 8F.

The reference numerals to the locking devices 19 and 19a correspond to those used in FIGS. 8A–8G in which different embodiments for the lock fitting and locking devices, respectively, will be described in more detail.

The elaboration of the nail-receiving devices 14 and the fixation means for the wearing soles in the lateral heels 16 will be described in FIGS. 3A–3D and FIGS. 4A–4C, respectively.

The basis profile I which is shown in FIG. 2A is by means of extrusion manufactured as a linear profile with one of the cross-sections shown in FIGS. 1A–1D. In the subsequent machining process areas 22 and tracks 23 are formed by removing the edges 3 on the places in question. The rounded shape of the lateral heels 16 is likewise formed by means of a subsequent process of the extruded linear profile. Hereinafter the profile is bent about a horn to obtain the desired curved horseshoe shape. Finally, the holes 12 for the positioning of the nail-receiving devices 14 are made and the locking device 19 and the pawls 17 are mounted.

The basis profile is advantageously manufactured from aluminium, however, other metals or materials may be used too.

Figure 3A:
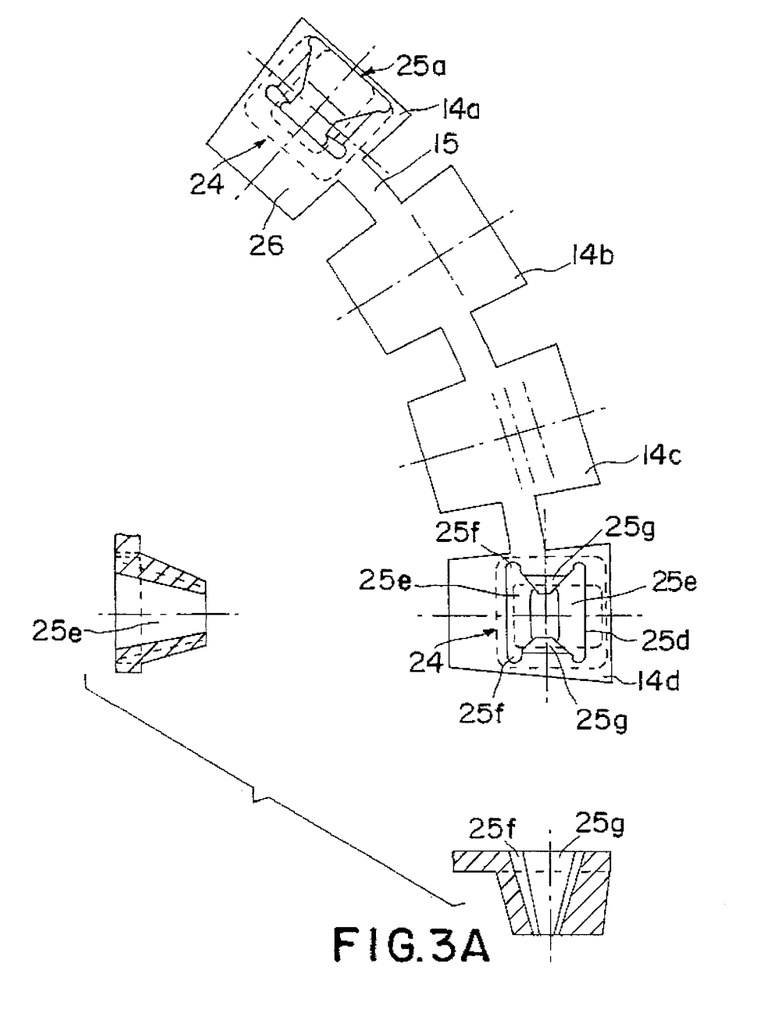
FIGS. 3A, 3B and 3C illustrate a row of nail-receiving devices and sectional views of the position of the nail-receiving devices in the basis profile.

FIG. 3A shows four nail-receiving devices 14a–14d which are mutually connected by means of connecting links 15. The outer contour 24 of the nail-receiving devices 14 (shown with broken lines) are provided so that these fit into the holes 12 of the basis profile 1, which are conical or pyramidal in shape. The inner contour of the individual nail-receiving devices vary depending on how far down on the hoof the nail is to be positioned. The first nail-receiving device 14a has an inner contour 25a in which the inclination of the center axis C in relation to the plane of the basis profile is different from 90° (see FIG. 3B). This is due to the fact that the place onto which the nail corresponding to the nail-receiving device 14a is to be positioned in the hoof, the outer contour of the hoof is not perpendicular in relation to the tread plane of the hoof and the nail has to be driven into the hoof obtuse angled in relation to the tread plane of the hoof and in relation to the plane of the basis profile. Further down along the hoof the inclination of the outer contour of the hoof is reduced and the nail has to be driven into the hoof in a corresponding more perpendicular angle. Therefore, the inner contour 25 in, e.g. the last nail-receiving device 14d has a center axis C which is substantially perpendicular to the plane of the basis profile (see FIG. 3C).

In the nail-receiving devices 14b and 14c the inner and outer contour is not shown, but the center axis of the inner contour may be positioned taking i.a. the thickness of the hoof as well as the inclination of the outer geometry of the hoof into consideration in the place in question.

In the corners of the nail-receiving contour 25d an elongation of the two opposite surfaces 25e of the contour is effected, thus the corners in the nail-receiving contour are removed and replaced by the shown roundings or recesses 25f on the two opposite surfaces 25g. Hereby it is achieved that the nail only carries on it plane surfaces in abutment with the surfaces 25e and 25g of the inner contour, whereby the risk of a notch effect is reduced substantially.

Figure 3B:
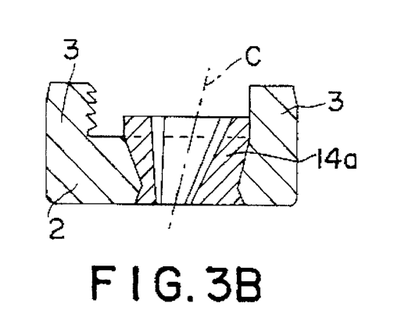

FIG. 3B shows a nail-receiving device 14a in which the center axis C of the inner contour 25a has a substantial inclination in relation to the plane of the basis profile 1. The nail-receiving device 14a shown in this figure has been provided with an outer contour 24, the cross-section of which forms a dovetail. A corresponding contour is provided in the hole 12 of the basis profile and thus the nail-receiving device 14a is firmly secured in the hole.

Figure 3C:
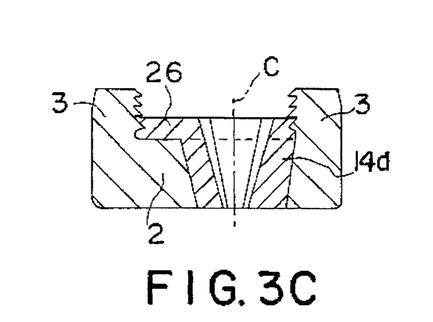

FIG. 3C shows a nail-receiving device 14d in which the center axis C is perpendicular to the plane P of the basis profile 1 and a nail which is driven into the hoof through this nail-receiving device will be driven into the hoof with the same angle. The nail-receiving device 14d in this figure has been provided with a flange 26 thus the nail-receiving device engages with the lowermost of the locking bars 5 along the inner side of each of the edges 3 and in this way it is firmly secured at the bottom of the canal 4 of the basis profile.

Figure 3D:
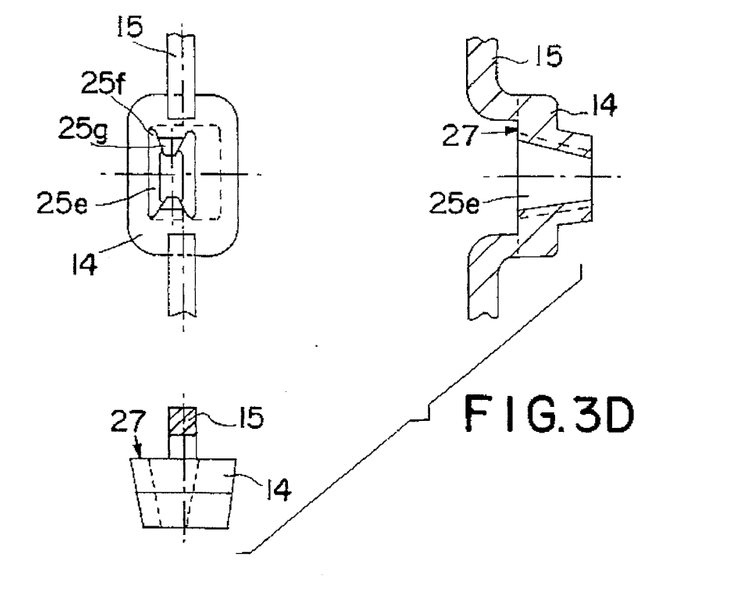
FIG. 3D illustrates an alternative embodiment of a nail-receiving device which is particularly useful in connection with the basis profile illustrated in FIG. 1E.

FIG. 3D shows a nail-receiving device 14 in which the connecting links 15 are elevated in relation to the upper side 27 of the nail-receiving devices unlike the nail-receiving devices shown in FIGS. 3B and 3C in which the connecting links run on a level with the top side of the nail-receiving devices. This nail-receiving device in which the connecting links 15 are elevated is intended for use in connection with a basis profile 1 which has a cross-section as illustrated in FIG. 1E. The connecting link 15 runs in the ridge 10 (see FIG. 1E) which is provided between the holes 12 of the basis profile in which the nail-receiving devices 14 are positioned.

Figure 4A:
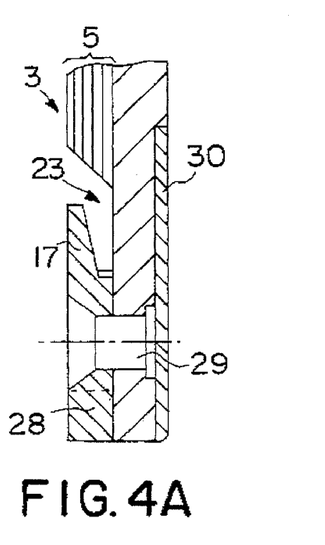
FIG. 4A illustrates a section of the elements in the lateral heel of the basis profile.
Figure 4B:
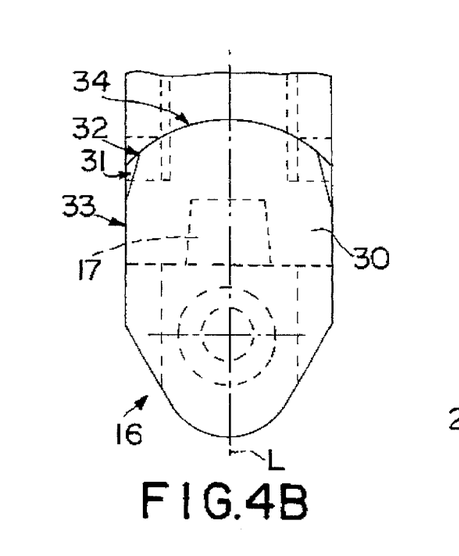
FIGS. 4B & 4C illustrate the lateral heel of the basis profile, seen from different angles.
Figure 4C:
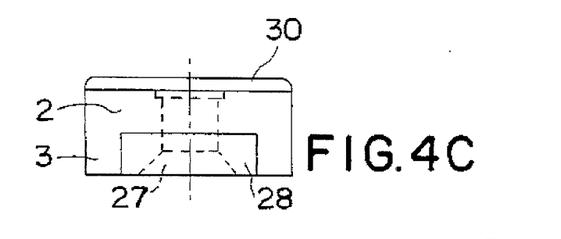

FIGS. 4A, 4B and 4C show a lateral heel 16 on the basis profile 1 whereto fixation means for fixation of the wearing soles to the basis profile are mounted. In the basis profile a part of the edges 3 are removed whereby tracks 23 are formed which run transversely to the longitudinal axis L of the profile (also cf. FIG. 2A). A pawl 17 extends along this longitudinal axis L. The pawl 17 is provided with a foot 28 which is arranged between the edges 3 and firmly secured to the furthest lateral heel 16 by means of a rivet 29. The rivet 29 may either be spot welded directly to the body 2 of the basis profile or spot welded on a wearing band 30 mounted on the opposite side of the basis profile 1.

The wearing band 30 is intended for reducing the wearing between the basis profile and the hoof. The basis profile will in this place abut the lateral heels of the hoof which through the movements of the horse will perform a transverse movement on top of the basis profile whereby substantial wearing occurs. The wearing band 30 can be secured in different ways. In the shown embodiment the wearing band 30 has been secured through the rivet 29, thus the rivet tightens the wearing band 30 and the foot 28 of the pawl around the body 2 of the basis profile. Advantageously, the wearing band 30 consists of a hard-wearing material which simultaneously does not give rise to corrosion of either the wearing band 30 or the basis profile 1. The wearing band 30 has substantially the same shape as the lateral heels 16 of the basis profile. The wearing band 30 has, however, been provided with recesses 31 in order to avoid misfit the corners 32 to the contours 33 of the profile when adjusted to the shape of the hoof. Furthermore, the innermost edge 34 on the wearing band 30 has a circular arc shape so that the lateral heel 16 of the basis profile may be bent without causing pressure in the track in which the wearing band has been mounted.

Figure 5A:
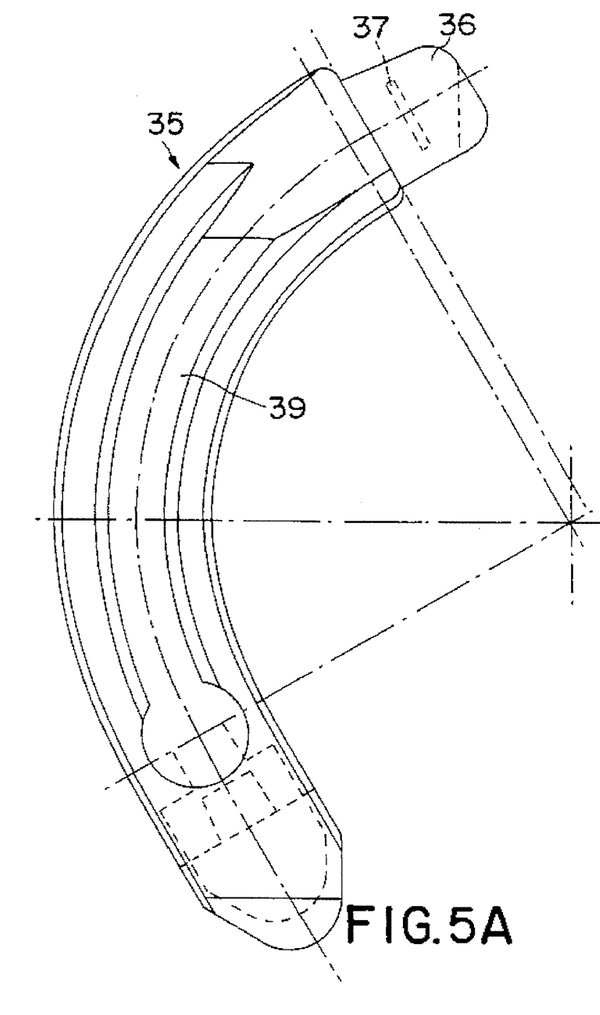
FIGS. 5A & 5B illustrate a wearing sole seen from different angles.
Figure 5B:
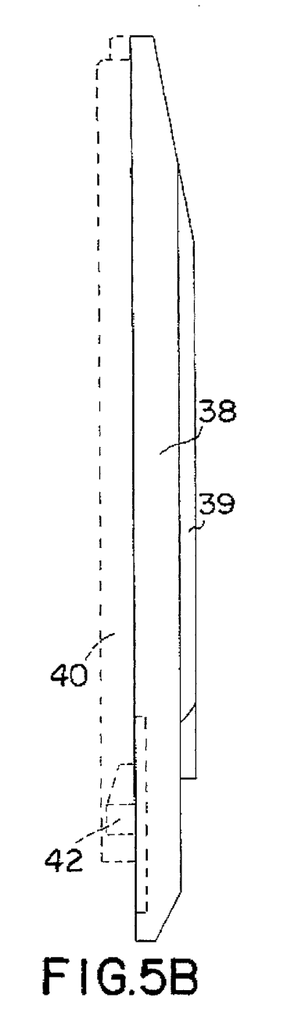
Figure 5C:
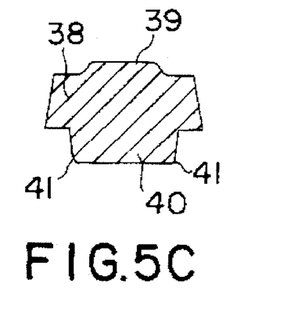

FIGS. 5A, 5B show a wearing sole 35 seen form different angles and FIG. 5C shows a section through a wearing sole 35. The wearing sole 35 is manufactured from a flexible and shock-absorbing material, preferably urethan. Other materials which meet the requirements of the flexibility, shock absorbing and wearing properties of the wearing soles 35 can, however, also be used.

Figure 6A:
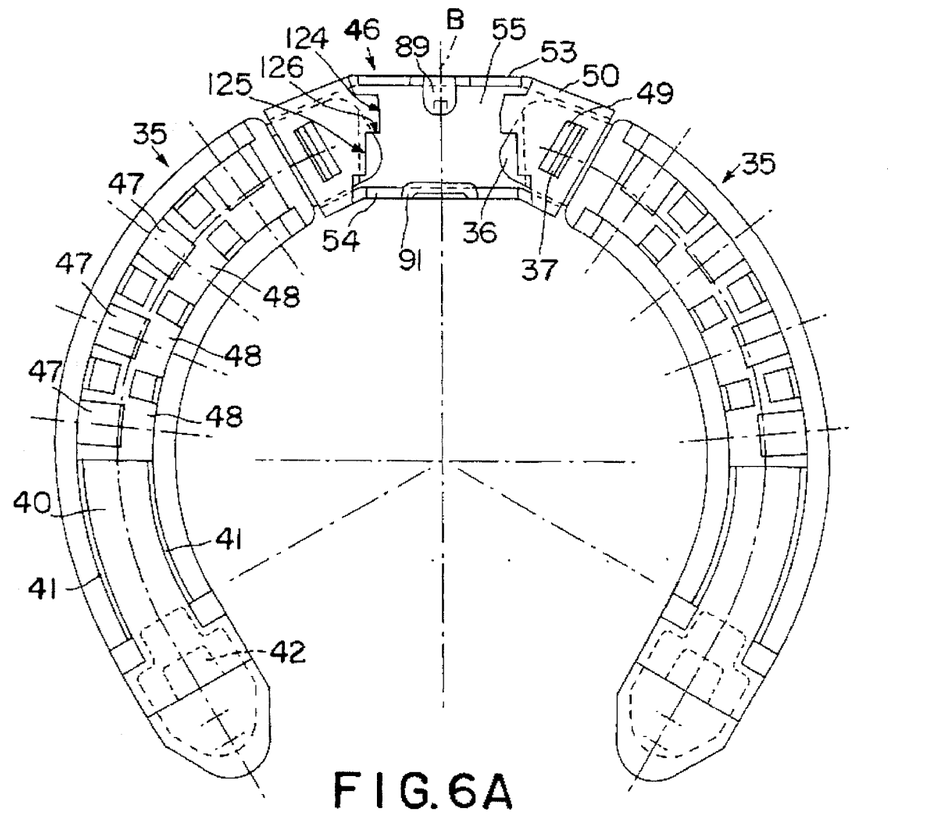
FIG. 6A illustrates a wearing plate mounted with two wearing soles.

The wearing sole 35 consists of a couple pin 36 with a bead 37 which engages with fixation means mounted on a wearing plate (see FIG. 6A). The branch of the wearing sole 35 proper consists of a core 38 which on its one side is provided with a depressing bead 39 which extends along the core 38. The depressing bead 39 constitutes a small elevation of the core 38 down towards the ground when the wearing sole 35 is mounted in the basis profile 1. On the other side the core 38 is provided with a locking bead 40 which engages with the locking bars 5 along the inner side of the edges 3 of the basis profile I when the wearing sole 35 is mounted in the profile. The locking bead 40 is provided with rounded edges 41 so that the bead can more easily be pushed into the canal 4 between the edges 3 of the basis profile. The core 38, the depressing bead 39 and the locking bead 40 constitute an integrated unit as the wearing sole 35 is manufactured from moulded urethan.

Figure 5D:
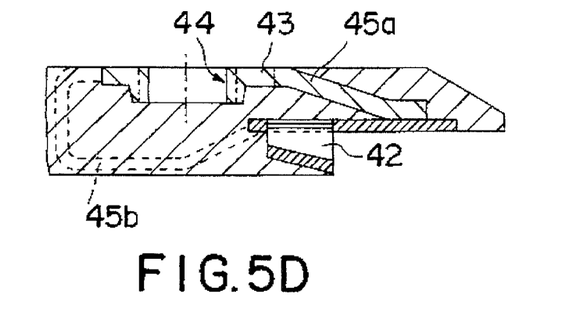

FIG. 5D is a section through the outermost end of the wearing sole 35. Here different elements are moulded into the synthetic materials from which the wearing sole is manufactured. An element 42 constitutes a conical hole for the pawl 17 (see FIG. 4A) which is secured to the outermost lateral heel 16. When the wearing sole 35 is mounted in the basis profile the pawl 17 will engage with this conical hole 42.

A mounting plate 43 in the shown embodiment is embedded in the wearing sole's 35 downwards facing part and the plate 43 is provided with a screw thread 44. Thus it becomes possible to screw in hooks or barbs into the wearing sole 35 for improving the foothold of the horse when riding in areas with icy or slippery surfaces.

The element 42 and the plate 43 are mutually connected to a spring strap 45a which is secured to the element 42. Alternatively, the element 42 and the plate 43 can be connected to a spring strap 45b (shown by broken lines). The spring strap 45a or 45b increases the stability of the position of the embedded plate 43 in the wearing sole and simultaneously the shock absorbing properties of the wearing sole are maintained. When the hoof of the horse is brought in contact with the ground the spring strap 45a or 45b will in combination with the flexibility of the wearing sole 35 ensure that the element 42 and the plate 43 can be displaced in relation to each other.

FIG. 6A shows two wearing soles 35 secured to a lock fitting 46 which is intended to be mounted to the basis profile 1 by means of the locking device 19 (see FIG. 2). The illustration is symmetrical about the line B. The lock fitting 46 is the part which has to secure the wearing plate to the basis profile 1 and secure the wearing soles 35 in the foremost end of these. In the shown embodiment the lock fitting 46 furthermore constitutes the wearing plate. The wearing soles 35 are here shown from the opposite side of the one illustrated in FIG. 5A. When used, the side illustrated in FIG. 6A faces towards the basis profile.

The wearing soles 35 comprise on this side the locking bead 40. In the locking bead recesses 47 are made which make room for nails when the wearing sole 35 is mounted on the basis profile. By mounting, other recesses 48 make room for the nail-receiving devices 14. The element 42 which is embedded in the wearing sole 35 is shown with broken contour lines.

The couple pins 36 with the bead 37 are in engagement with the lock fitting 46 through holding ridges 49 provided in a hold portion 50 which constitutes a closed quadrangular profile which encircles the couple pin 36 and which is positioned in each end of the lock fitting 46. The hold 50 is angled in relation to the rest of the lock fitting 46 in order to follow the arced horseshoe-shape of the basis profile.

The lock fitting 46 further comprises a dowel pin 89 and a tongue 91 (see FIG. 8D) which constitute parts of two bent edges 53,54 which are bent in relation to the surface 55 of the lock fitting 46. The dowel pin 89 and the tongue 91 are intended to engage with the corresponding recesses 84,89 (see FIG. 8D) in the locking device 19 mounted in the basis profile 1. An inner edge on the holds is formed with a contour identical to the side edges on the fixation means shown in FIG. 2A, i.e. the two edges 125,126 which are substantially parallel to the symmetrical axis B and an edge 127 which is substantially perpendicular on the symmetrical axis B. Longitudinal and transverse forces may thus be transmitted between the fixation means and the lock fitting.

Figure 6B:
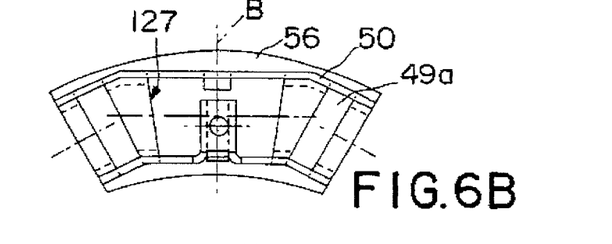
FIGS. 6B & 6C illustrate different embodiment of a lock fitting.

FIG. 6B shows an embodiment in which the lock fitting 46 is provided with a separate wearing plate 56. The hold 50 of the lock fitting 46 is substantially elaborated as the hold 50 on the lock fitting in FIG. 6A. In the closed quadrangular profile which forms the hold 50, a holding track 49a is formed by means of punching or bending down a part of the quadrangular profile which track is somewhat larger than the holding slot in FIG. 6A and which extends transversely of the entire hold 50. The locking bead 37 has to be correspondingly larger in order to fit to the elaboration of the holding ;crack.

Figure 6C:
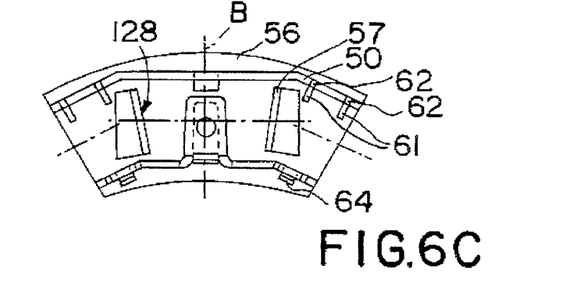

FIG. 6C shows an alternative embodiment of the hold 50 of the lock fitting 46. The lock fitting 46 is here likewise provided with a wearing plate 56. The hold SO constitutes an open substantially U-shaped profile. The couple pins 36 on the wearing soles 35 are thus not surrounded by the hold. The wearing soles are secured by means of a spring strap 65 (see FIG. 7A) which is tightened to the couple pin 36, and the edges 67,68 of the spring strap (see FIG. 7A) engage with the recesses 61, 62, respectively, and about backstops 64 provided in the lock fitting 46.

As an alternative to the spring strap 65, a pin 69 (see FIG. 7B) positioned at the bottom of the open profile which constitutes the hold 50 may be secured for fixation of the couple pin 36 to the lock fitting 46.

The lock fitting 46 is furthermore provided with flaps 57 (extending out of the plane of the Figure) which are formed by partly punched and bent parts of the surface 55. These flaps 57 prevent the lock fitting 46 when this in mounted on the basis profile from being displaced in relation to the fixation means 19.

The lock fittings shown in FIG. 6B and FIG. 6C are intended for cooperation with the fixation means shown in FIG. 2B. The edges 128,129 which are formed of the hold 50 in FIG. 6B and of the flaps 57 in FIG. 6C, respectively, abut to the inclined surfaces 123,124 on the fixation means 19 (see FIG. 2B) when the fixation means 19 and the lock fitting 46 are connected. Thus transverse and longitudinal forces may be transmitted between the locking device and the lock fitting.

Figure 7A:
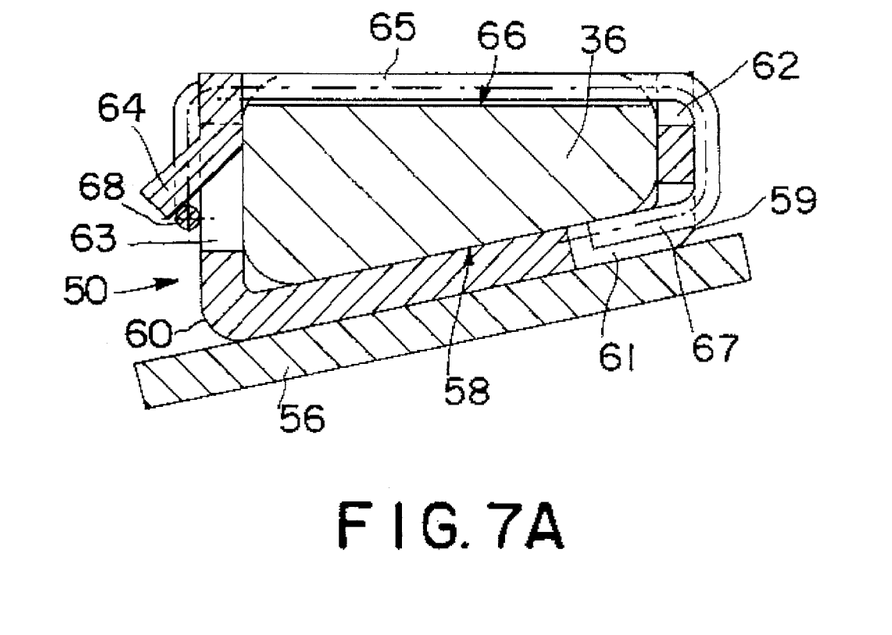
FIGS. 7A & 7B illustrate sections through alternative assemblings of the wearing plate with the wearing soles.

FIG. 7A illustrates how the couple pin 36 of the wearing sole 35 is secured to a lock fitting 46 of the type illustrated in FIG. 6C. The hold 50 which is provided in each end of the lock fitting forms as mentioned an open substantially U-shaped profile. The couple pin 36 is arranged in this open profile so that the under side 58 abuts to the bottom of the profile. The hold 50 is provided with recesses 61,62 and a backstop 64. The backstop is formed by partly punching and a bending parts of one of the branches 63 of the U-shaped profile. A spring strap 65 extends around the upper side 66 of the couple pin 36 and as mentioned the ends 67,68 of the spring strap 65 engage with the recesses 61 and about the backstop 64, respectively. In this embodiment the lock fitting is provided with a separate wearing plate 56 which is welded on to the lock fitting on at least the part which forms the hold 50.

Figure 7B:
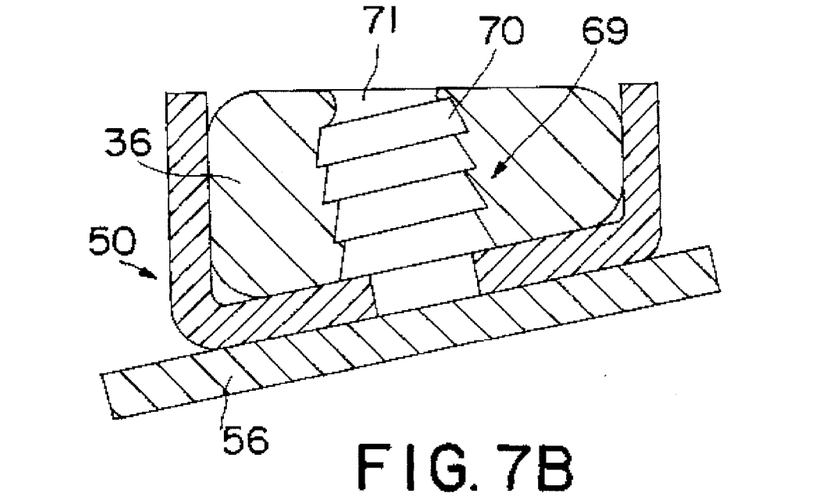

FIG. 7B shows an alternative embodiment to the one illustrated in FIG. 6C and in FIG. 7A. At the bottom of the open profile which the hold 50 constitutes, a pin 69 is secured. By means of barbs 70 on the pin, the couple pin 36 of the wearing sole 35 is secured to the lock fitting 46 so that the pin 69 is led into a hole 71 in the couple pin 36. Moreover, in this alternative embodiment the lock fitting is provided with a wearing plate 56 on at least the part which constitutes the hold 50.

FIGS. 8A to 8G illustrate different embodiments of locking devices for securing a wearing plate 56 through the lock fitting 46 to the basis profile 1 through the, locking device 19.

Figure 8A:
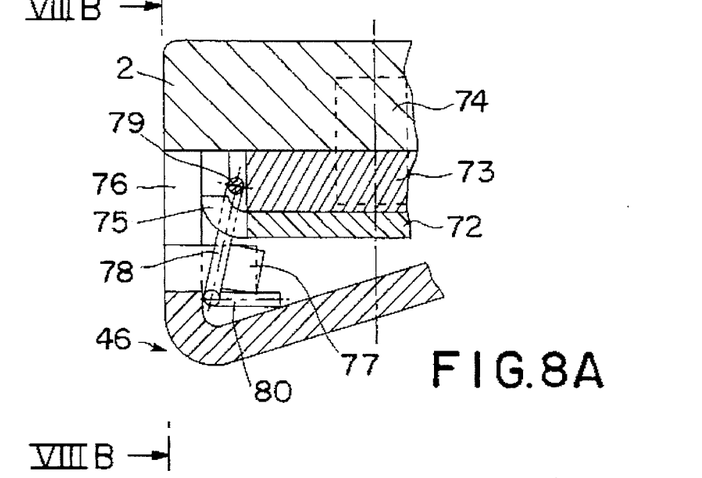
FIGS. 8A, 8B, 8C, 8D, 8E, 8F & 8G illustrate sections through different embodiments of fixation means for fixation of the wearing plate to the basis profile.
Figure 8B:
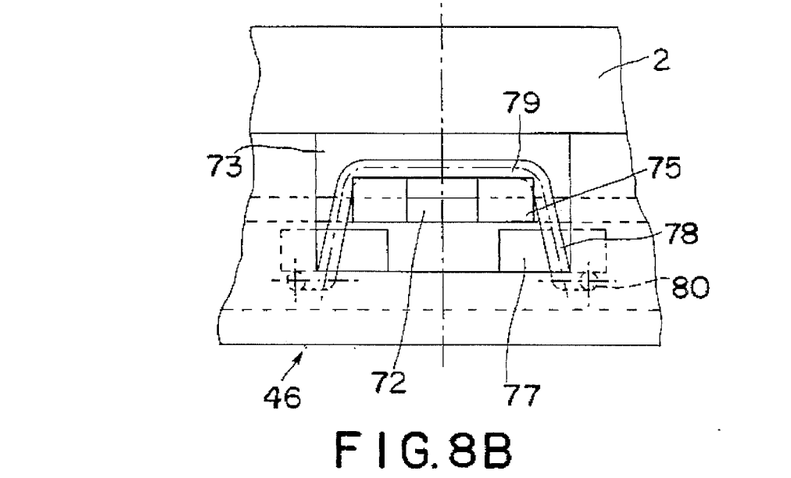

FIGS. 8A and 8B show the rearmost end of a lock fitting 46 and locking devices. A plate spring 72 and a base plate 73 are secured to the basis profile by means of a rivet 74. The plate spring 72 is provided with an upwards facing backstop 75. The lock fitting 46 is provided with a slot 76 and a backstop 77 facing downwards and inwards in the lock fitting. A spring strap 78 secures the lock fitting 46 to the plate spring 72 by the ends 79,80 of the spring strap 78 coupling the backstop 75 of the plate spring 72 and the backstop 77 of the lock fitting 46, respectively, see FIG. 8B.

Figure 8C:
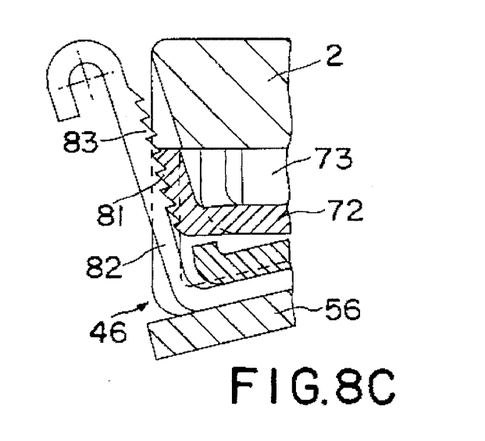

FIG. 8C is an alternative embodiment. The plate spring 72 and the base plate 73 are likewise secured to the basis profile by means of rivets 74 (not shown). In this embodiment the plate spring 72 is provided with backstops in the form of a serrated surface 81 with upwards facing "cuts". A leaf spring strap 82 is secured between the lock fitting 46 and the wearing plate 56. The leaf spring strap 82 is provided with a serrated surface 83 corresponding the one on the plate spring 72, as the "cuts" face downwards. The wearing plate 56 is secured to the basis profile by engaging the serrations 81,83 on the plate spring 72 and the leaf spring strap 82 to each other, respectively.

Figure 8D:
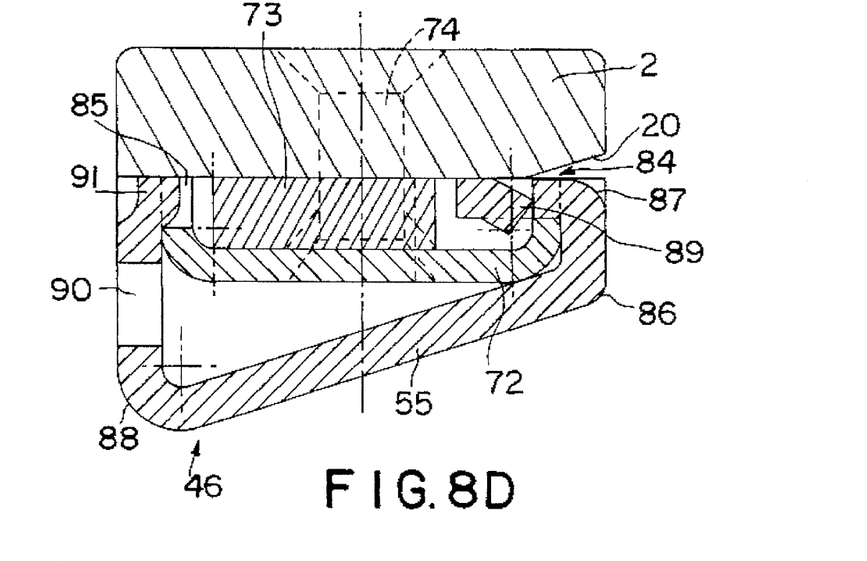

FIG. 8D is also an embodiment in which the plate spring 72 and the base plate 73 are secured to the basis profile by means of a rivet 74. The plate spring 72 is foremost and rearmost provided with slots 84,85. In the shown embodiment the lock fitting 46 furthermore constitutes the wearing plate and consists of a surface 55 with various bendings 86,87,88. In the bending 87 a backstop 89 is formed while the bending 88 comprises a hole 90 and a tongue 91. The lock fitting 46 is sucured to the basis profile by leading the bending 87 into the slot 84 in the plate spring 72 after which the tongue 91 is led down over the plate spring 72 and engages with the slot 85.

As an alternative to the locking of the rearmost part of the lock fitting 46 by means of a tongue 91, which engages with the slot 85, the embodiment shown in FIG. 8A may be used.

Figure 8E:
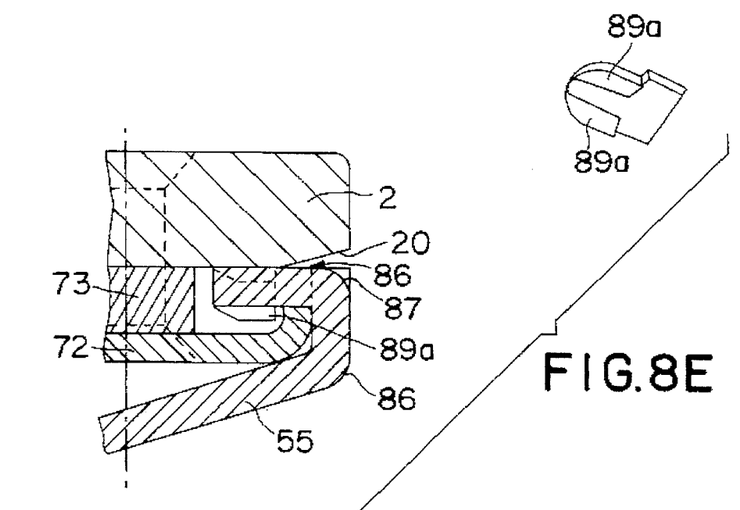

FIG. 8E shows how the bending 87 shown in FIG. 8D can alternatively be elaborated. The backstop 89a forms a bar which provides a broader contact face to the plate spring 72. By this elaboration a better securing of the lock fitting 46 is achieved.

Figure 8F:
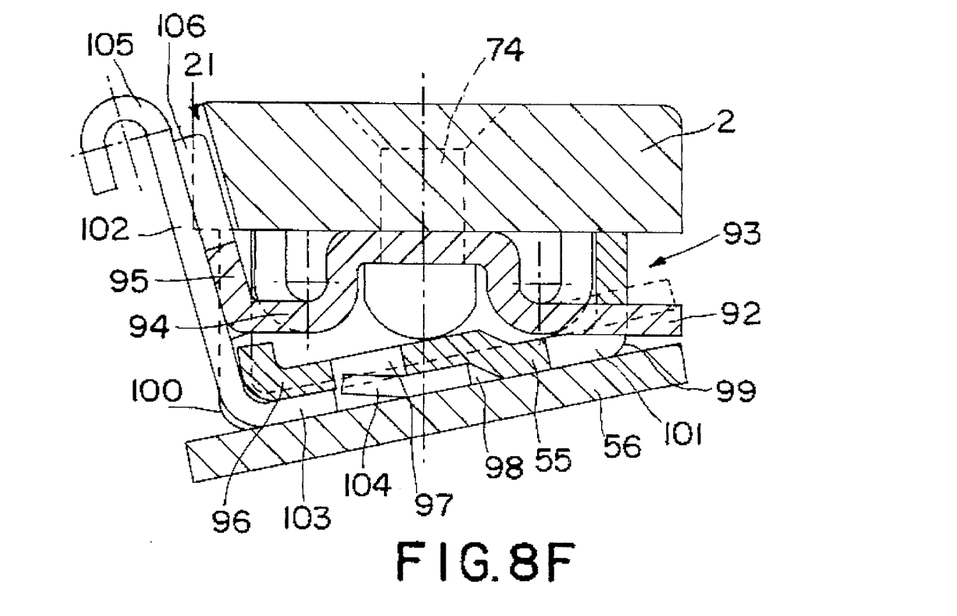

FIG. 8F is an embodiment in which the plate spring 72 has been bent in such a way that it at the middle abuts to the body 2 of the basis profile and is secured to the latter by means of rivets 74. This is an alternative embodiment of the application of the base plate 73. Foremost a part 92 of the plate spring 72 is bent upwards so that a groove 93 is formed while rearmost a part 94 of the plate spring 72 is bent so that a retaining pin 95 is formed. The lock fitting 46 consists of the surface 55 in which a countersinking 96 is formed in the middle. This countersinking 96 is provided with a hole 97 and when the wearing plate 56 is secured to the lock fitting 46 the countersinking 96 and the wearing plate 56 form a pocket 98. The lock fitting 46 further comprises bendings 99,100 and in the bending 99 a slot 101 is formed. A leaf spring strap 102 comprises in the one end 103 a locking pin 104 and in the other end 105 a bent spring pad 106. The leaf spring strap 102 is mounted in the lock fitting 46 by sliding the one end 103 into the pocket 98 formed between the countersinking 96 and the wearing plate 56. The locking pin 104 will then engage with the hole 97 in the countersinking 96. The wearing plate 56 is secured to the basis profile by leading the foremost part 92 of the plate spring 72 into the slot 101 in the lock fitting 46 after which the leaf spring strap 102 is led down over the rearmost part 94 of the plate spring 72, thus the bent spring pad 106 couples the retaining pin 95.

Alternatively, the embodiment illustrated in FIG. 8C may be used for securing the rearmost part of the lock fitting 46.

Figure 8G:
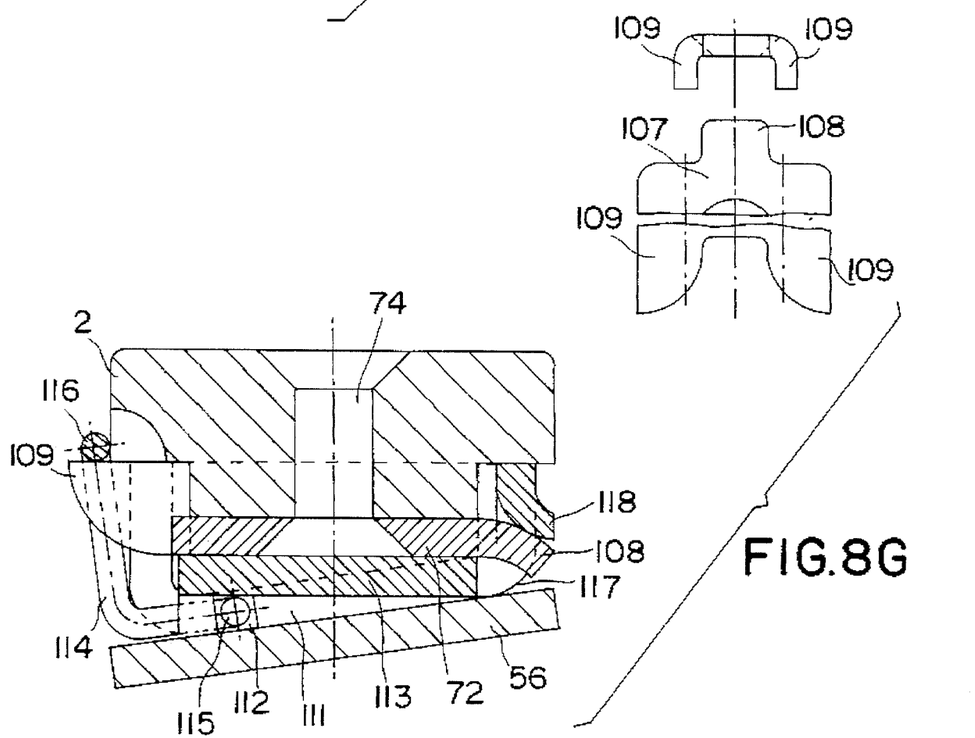

FIG. 8G shows an embodiment of a lock fitting 46 which can be used in connection with a basis profile of the type illustrated in FIG. 1E. A plate spring 72 in secured to the body 2 of the basis profile by means of rivets 74. The plate spring 72 is shown in cuts. It consists of a surface portion 107, a resilient tongue 108 and two tongues 109 which are bent in such a way that the plate spring obtains the cross-section which is illustrated in the cuts and in the main figure. On the wearing plate 56 a lock fitting 46 is secured which i.a. comprises a central part consisting of bendings 111 with holes 112 and a contact face 113.

The lock fitting 46 is secured to the basis profile by means of a spring strap 114 whose one end 115 couples in the holes 112 in the lock fitting 46 and whose other end 116 couples around the two upwards facing tongues 109 on the plate spring 72. The lock fitting 46 is provided with a bending 117 in which a tongue 118 is formed and which abuts to the resilient tongue 108 on the plate spring 72.

The embodiments illustrated in the previously mentioned Figs. are all very specific in their elaboration. The illustrated embodiments are just meant as examples and not as a limitation of the present invention.

I claim:

1. A horseshoe assembly comprising a basis profile consisting of a body having holes for nails, a wearing plate with means for attachment to the basis profile, wearing soles with means for attachment to the basis profile and the wearing plate, and nail-receiving devices mounted in the holes of the basis profile, wherein the wearing plate comprises a lock fitting which is arranged between the wearing plate and the basis profile and which cooperates with first locking devices on the basis profile, and wherein the wearing soles comprise second locking devices comprising coupling pins and pawl-receiving elements which are mounted in foremost and rearmost parts of each wearing sole, respectively, and which cooperate with third locking devices comprising hold means and pawls on the wearing plate and basis profile, respectively.

2. A horseshoe according to claim 1, wherein inner contours of at least one of the nail-receiving devices have a centre axis which is not perpendicular in relation to a plane of the basis profile.

3. A horseshoe according to claim 1, wherein said basis profile provides opposed lateral heels, wherein a said pawls are respectively mounted to said lateral heels, wherein a foot of each pawl extends across a longitudinal axis of the basis profile in the lateral heel, and wherein each wearing sole is provided with a hole, the pawl in each lateral heel of the basis profile engaging firmly with a said hole when a wearing sole is mounted on each lateral heel of the basis profile.

4. A horseshoe according to claim 3, wherein each wearing sole at a side thereof facing away from said basis profile comprises a depressing bead extending along a central part of a longitudinal axis of the wearing sole and ending at a distance from a said hole in the wearing sole, said hole being engagable with an adjacent pawl.

5. A horseshoe according to claim 1, wherein said holes in the basis profile are conical or pyramidal shaped, and wherein the nail-receiving devices have a corresponding outer contours.

6. A horseshoe according to claim 1, wherein said first locking devices of the basis profile comprise locking parts which are arranged on both foremost and rearmost parts of the locking devices, and wherein the lock fitting of the wearing plate comprises locking parts which cooperate with said locking devices of the basis profile, and which is arranged on both a foremost and rearmost part of the lock fitting.

7. A horseshoe according to claim 1, wherein the wearing soles are made of a flexible material.

8. A horseshoe according to claim 7, wherein said flexible material is urethan.

9. A horseshoe according to claim 1, wherein the basis profile over at least a part of its length is provided with a wearing band which is mounted along a surface thereof facing away from the nail-receiving devices.

10. A horseshoe according to claim 1, wherein said body of said basis profile defines a substantially planar surface at the side facing away from the nail-receiving devices and wherein a surface facing the nail-receiving devices and which cooperates with the wearing soles comprises two protruding edges which are positioned along the side areas of the body and which together with the body form a U-shaped canal.

11. A horseshoe according to claim 1, wherein said body of said basis profile defines a substantially planar surface at the side facing away from the nail-receiving devices and wherein a surface facing the nail-receiving devices and which cooperates with the wearing soles comprises a centrally positioned bar.

12. A method for shoeing horses wherein the horseshoe according to claim 1 is used and comprising the steps of securing nail-receiving devices in the holes (12) of the basis profile, so that the basis profile is in abutment with a horse's hoof, inserting nails through the nail-receiving devices and driving them into the hoof, connecting the wearing plate and the wearing soles by means of coupling pins and holds as well as pawl-receiving elements and pawls and securing the wearing plate and wearing soles to the basis profile by means of a lock fitting.

* * * * *

UNITED STATES PATENT AND TRADEMARK OFFICE
CERTIFICATE OF CORRECTION

PATENT NO. : 5,538,083
DATED : July 23, 1996
INVENTOR(S) : Søren Vindriis

It is certified that error appears in the above-indentified patent and that said Letters Patent is hereby corrected as shown below:

On the title page: Item

[30] Foreign Application Priority Data
March 10, 1992 [DK] Denmark 0319/92

Signed and Sealed this

Seventh Day of January, 1997

Attest:

BRUCE LEHMAN

*Attesting Officer*    *Commissioner of Patents and Trademarks*